United States Patent [19]

Wirth

[11] 3,860,978
[45] Jan. 21, 1975

[54] TIME SAVING DRAIN ASSEMBLY FOR SINKS, BATHTUBS, ETC.

[76] Inventor: Paul H. Wirth, 1152 Lakeland Ave., Bohemia, N.Y. 11716

[22] Filed: May 18, 1973

[21] Appl. No.: 361,505

[52] U.S. Cl. .................... 4/207, 138/106, 138/121, 138/DIG. 8, 248/67.5, 248/68 R, 248/74 R, 285/157
[51] Int. Cl. ........................................... E03c 1/284
[58] Field of Search ..................... 4/1, 8, 10, 2–5, 4/166, 95, 187, 207, 191, 188, DIG. 7; 138/106, 107, 121, DIG. 8, 118; 285/157, 423, DIG. 4; 248/68 R, 67.5, 74 R; 403/391; 15/314; 4/197, 206

[56] References Cited
UNITED STATES PATENTS

| | | | |
|---|---|---|---|
| 2,843,363 | 7/1958 | Mailander | 248/68 R |
| 2,912,199 | 11/1959 | Breisch | 248/74 R |
| 3,310,813 | 3/1967 | Jonsson | 4/7 |
| 3,313,314 | 9/1967 | Burke et al. | 138/118 X |
| 3,470,900 | 10/1969 | Rothauser | 285/157 |
| 3,522,365 | 7/1970 | Dannes | 403/391 |
| 3,604,687 | 9/1971 | Moore | 403/391 |
| 3,605,232 | 9/1971 | Hines | 138/121 |
| 3,669,491 | 6/1972 | Weslock | 403/391 |
| 3,730,228 | 5/1973 | Gibbs | 4/1 |

OTHER PUBLICATIONS

Packless Metal Prod. Corp. — Reprinted from "Industrial Equipment News" et al., Rec'd Jan. 16, 1939.

Primary Examiner—John W. Huckert
Assistant Examiner—Stuart S. Levy
Attorney, Agent, or Firm—Richard L. Miller

[57] ABSTRACT

A novel trap for easy installation in a plumbing system, and being fitted between a drain fitting of a plumbing fixture and a sewer line; the device consisting of a flexible hose made of a suitable material and which has a wall configurated into adjacent transverse accordian pleats so that the hose can be longitudinally flexed into bends without deformation and constricting the passage therethrough, fittings at opposite ends of the hose for connections, and a removable separate clamp for maintaining the hose in a U-shape so to form a trap.

3 Claims, 4 Drawing Figures

PATENTED JAN 21 1975         3,860,978
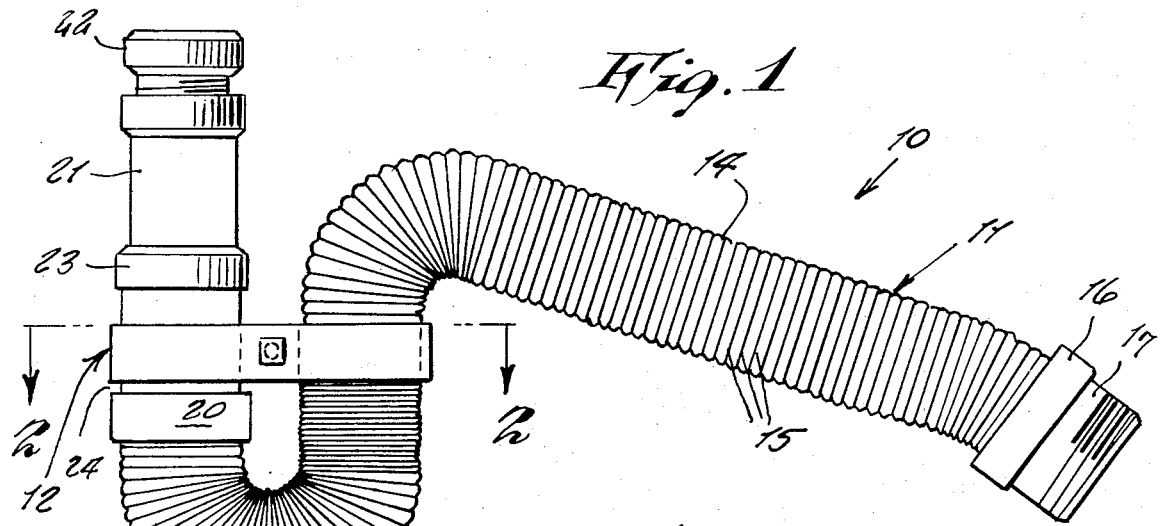
Fig. 1
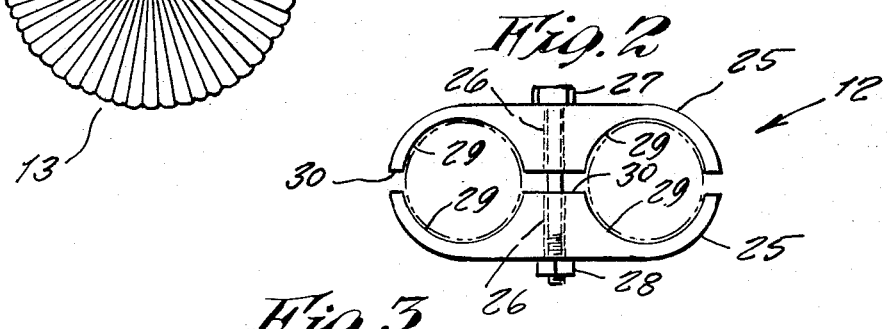
Fig. 2
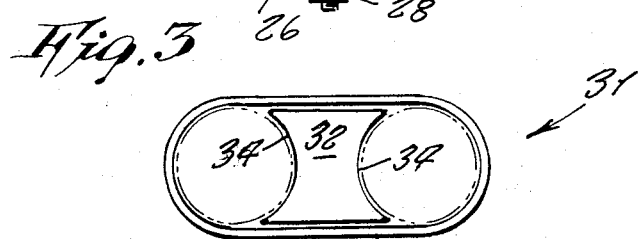
Fig. 3
Fig. 4
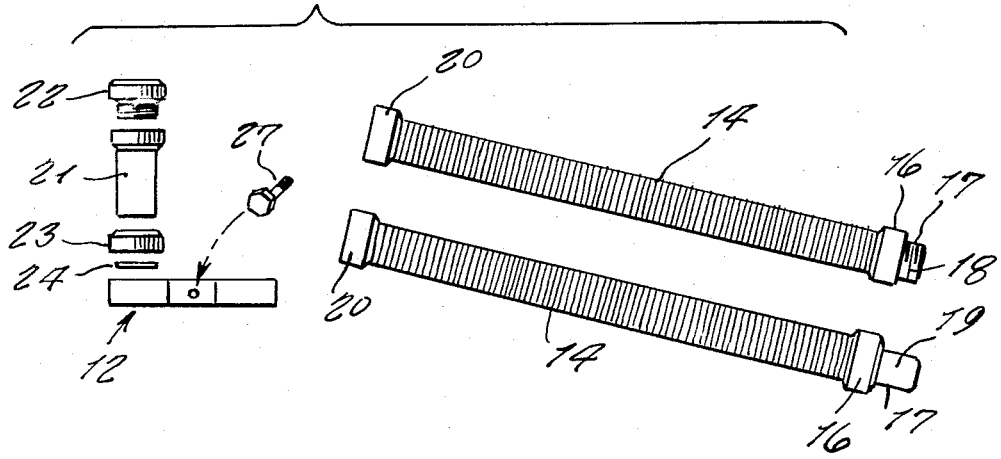

TIME SAVING DRAIN ASSEMBLY FOR SINKS, BATHTUBS, ETC.

This invention relates generally to plumbing equipment.

A principle object of the present invention is to provide a new type of trap for a sink, wash bowl, bathtub or the like, and which is readily adjustable in shape so that it can easily accommodate itself for precisely fitting between a fixture drain and a sewer line.

Another object is to provide a time saving drain assembly which accordingly eliminates the necessity of employing a conventional trap wherein the same is of stiff material so that it cannot be flexed in order to accommodate a correct fit between the connecting parts.

Yet another object is to provide a time saving drain assembly which accordingly can be installed by any novice without particular skill, and wherein the job is quick and easy to do.

Yet a further object is to provide a time saving drain assembly which alternately is readily adaptable for installation as an elbow in a line wherein the same must be of an irregular shape so as to accommodate a specific limited area or pass around various obstructions, and which otherwise would require a laborous and expensive assembly of conventional parts to accomplish the shape and which thereafter might be more difficult due to its stiffness to fit in the intended place.

Other objects are to provide a time saving drain assembly for sinks, bathtubs, etc., which is simple in design, inexpensive to manufacture, rugged in construction, easy to use and efficient in operation.

These and other objects will be readily evident upon a study of the following specification and the accompanying drawing wherein:

FIG. 1 is a side view of the invention.

FIG. 2 is a view of the clamp as viewed in direction 2—2 of FIG. 1.

FIG. 3 is a similar view of a modified clamp.

FIG. 4 is a side view of the components shown separated.

Referring now to the drawing in detail, the reference numeral 10 represents a time saving drain assembly for sinks, bathtubs, etc., according to the present invention wherein there is hose assembly 11 for extending and connecting between two plumbing components, and wherein there is also a clamp 12 for maintaining the hose assembly 11 in a specific shape so as to serve as a trap 13 as shown in FIG. 1.

The hose assembly 11 includes a length of hose of 14 made of any material suitable to the intended purpose, and which accordingly may be of plastic or metal. The hose 14 comprises a side wall around a central passage extending therethrough; the side wall being formed in the shape of a series of transverse, adjacent, corrugation pleats 15 throughout the length of the hose, so the hose can bend. One end of the hose has a male collar fitting 16 secured thereto which is integral with an outward extending sleeve 17 that is either externally threaded as shown at 18 or which otherwise is smooth exterior surfaced as shown at 19 so to be slidable into a connecting plumbing part.

The other end of the hose 14 has a female collar fitting 20 secured thereto, and which is adaptable to slidably receive a separate sleeve 21 which has an internal screw thread so to engage externally sleeve 22. A nut 23 and washer 24 are fitted around the sleeve 21.

In installing the device for use as a trap, as shown in FIG. 1, a clamp 12 is fitted around the hose assembly 11 so that a U-shaped configurated trap 13 is thus formed by bending of the hose 14; the clamp holding the hose in the intended shape.

The clamp 12 consists of two like, separate jaws 25 which at its center has a transverse opening 26 therethrough so to receive an interconnecting bolt 27 fitted with nut 28. Each opposite end of the jaw has a semi circular groove 29 that opens out on a longitudinal common side 30 of the jaw. Thus when the jaws are placed on opposite sides of the hose assembly as shown in FIG. 1, and the bolt 27 is passed through the jaws and tightened, the trap shape is retained.

Alternately a clamp 31, shown in FIG. 3 may be employed instead of the above described clamp. Clamp 31 includes a singular block 32 and an elastic band 33. The block 32 has an arcuate notch 34 on opposite sides thereof for fitting between facing sides of the hose assembly to form the U-shaped trap, after which the band 33 slides around the outer side thereof. Thus the trap configuration is retained.

Either of the clamps is quick and easy to install or remove so that even a novice can do the job.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

What is claimed is as follows:

1. A time saving drain assembly for sinks, bathtubs, or the like, which comprises:
   a. a continuous flexible length of hose designed with a bellows type construction so that said hose may be stretched, compressed and reshaped, said hose having openings only at its two ends, being adaptable to be flexed into a plumbing trap configuration, and which has been designed not to tear and crush when bent to form a curve of diameter slightly over twice the diameter of said hose;
   b. means for connecting said two ends of said hose to plumbing so that material being transported through said hose can not escape; and
   c. means for releasably clamping said hose to the plumbing to form a portion of said flexible hose into a U-shaped section and maintain said U-shaped section in a rigid upright position wherein by removing said clamp and upsetting the U-shaped section of said trap configuration while manipulating said hose a blockage in the hose can be cleared without allowing material being transported through said hose to escape.

2. The combination as set forth in claim 1 wherein said means for clamping said hose further comprises a singular block having arcuated notches on opposite side thereof for fitting between said plumbing and said flexible hose which form the legs of said U-shaped section and an endless elastic band stretched around said U-shaped section for retaining said legs in said notches of said block.

3. The combination as set forth in claim 1 wherein means for clamping said hose further comprises two identical separate jaws each having a thickness of at least one-fourth the diameter of said hose, each having at its center a transverse opening, a bolt received through said openings and fitted with a nut, and each opposite end of each said jaw having a semi-circular groove along a same common line for respectively receiving said plumbing and said flexible hose forming said U-shaped section.

* * * * *